(12) United States Patent
Foth

(10) Patent No.: US 7,072,473 B2
(45) Date of Patent: *Jul. 4, 2006

(54) METHOD AND SYSTEM FOR SECURE DELIVERY AND RETRIEVAL OF DOCUMENTS UTILIZING A FACSIMILE MACHINE

(75) Inventor: Thomas J. Foth, Trumbull, CT (US)

(73) Assignee: Pitney Bowes Inc., Stamford, CT (US)

( * ) Notice: Subject to any disclaimer, the term of this patent is extended or adjusted under 35 U.S.C. 154(b) by 887 days.

This patent is subject to a terminal disclaimer.

(21) Appl. No.: 09/904,395

(22) Filed: Jul. 12, 2001

(65) Prior Publication Data

US 2003/0012379 A1    Jan. 16, 2003

(51) Int. Cl.
*H04N 1/44* (2006.01)
*H04L 15/34* (2006.01)
*H04K 1/00* (2006.01)

(52) U.S. Cl. .................. 380/243; 380/51; 380/271
(58) Field of Classification Search ................ 713/201; 380/243, 51, 271
See application file for complete search history.

(56) References Cited

U.S. PATENT DOCUMENTS

| | | | |
|---|---|---|---|
| 5,068,888 A * | 11/1991 | Scherk et al. .......... | 379/100.11 |
| 5,168,444 A | 12/1992 | Cukor et al. | |
| 5,283,871 A | 2/1994 | Kobayashi | |
| 5,327,486 A | 7/1994 | Wolff et al. | |
| 5,459,458 A | 10/1995 | Richardson et al. | |
| 5,513,126 A | 4/1996 | Harkins et al. | |
| 5,633,932 A | 5/1997 | Davis et al. | |
| 5,675,507 A | 10/1997 | Bobo, II | |
| 5,692,048 A | 11/1997 | Gormish et al. | |
| 5,742,905 A | 4/1998 | Pepe et al. | |
| 5,787,149 A | 7/1998 | Yousefi et al. | |
| 5,790,790 A | 8/1998 | Smith et al. | |
| 5,802,460 A | 9/1998 | Parvulescu et al. | |
| 5,832,221 A | 11/1998 | Jones | |

(Continued)

FOREIGN PATENT DOCUMENTS

EP    0821507 A2    1/1998

(Continued)

OTHER PUBLICATIONS

Specification of U.S. Appl. No. 09/707,561, titled "Method and System for Remote Retrieval of Documents," filed Nov. 7, 2000.

(Continued)

*Primary Examiner*—Christopher Revak
*Assistant Examiner*—Kaveh Abrishamkar
(74) *Attorney, Agent, or Firm*—Brian A. Lemm; Angelo N. Chaclas

(57) ABSTRACT

A system and method for providing secure, on-demand delivery and retrieval of documents, messages and the like utilizing an adaptor coupled to a facsimile machine. An adaptor is coupled between a facsimile machine and a telephone line. A mobile device communicates with the adaptor to allow a user to log onto a document delivery system, via the telephone line, and select a document, message or the like to be printed. The telephone number of the facsimile machine is provided to the data center by the adaptor or mobile device, and the data center then sends the selected documents to the facsimile machine through the adaptor. Alternatively, the data center can encrypt the documents before sending, and a key is used by the adaptor to decrypt the documents prior to sending to the facsimile machine.

33 Claims, 3 Drawing Sheets

U.S. PATENT DOCUMENTS

| | | | |
|---|---|---|---|
| 5,873,077 A * | 2/1999 | Kanoh et al. | 707/3 |
| 5,966,663 A | 10/1999 | Gleason | |
| 5,983,073 A | 11/1999 | Ditzik | |
| 6,002,752 A * | 12/1999 | Park | 379/100.15 |
| 6,006,087 A | 12/1999 | Amin | |
| 6,008,727 A | 12/1999 | Want et al. | |
| 6,008,921 A | 12/1999 | Brusky et al. | |
| 6,061,448 A | 5/2000 | Smith et al. | |
| 6,072,862 A | 6/2000 | Srinivasan | |
| 6,119,137 A | 9/2000 | Smith et al. | |
| 6,134,433 A | 10/2000 | Joong et al. | |
| 6,169,805 B1 | 1/2001 | Dunn et al. | |
| 6,184,996 B1 | 2/2001 | Gase | |
| 6,212,550 B1 | 4/2001 | Segur | |
| 6,216,158 B1 | 4/2001 | Luo et al. | |
| 6,233,684 B1 | 5/2001 | Stefik et al. | |
| 6,240,183 B1 | 5/2001 | Marchant | |
| 6,256,378 B1 | 7/2001 | Iggulden et al. | |
| 6,272,530 B1 | 8/2001 | Horiuchi et al. | |
| 6,289,212 B1 | 9/2001 | Stein et al. | |
| 6,289,389 B1 | 9/2001 | Kikinis | |
| 6,297,891 B1 | 10/2001 | Kara | |
| 6,314,454 B1 | 11/2001 | Wang et al. | |
| 6,378,070 B1 | 4/2002 | Chan et al. | |
| 6,389,115 B1 | 5/2002 | Swistock | |
| 6,430,601 B1 * | 8/2002 | Eldridge et al. | 709/206 |
| 6,460,073 B1 | 10/2002 | Asakura | |
| 6,493,696 B1 | 12/2002 | Chazin | |
| 6,553,240 B1 | 4/2003 | Dervarics | |
| 6,587,871 B1 | 7/2003 | Schrader | |
| 6,591,367 B1 | 7/2003 | Kobata et al. | |
| 6,594,349 B1 | 7/2003 | Fortman | |
| 6,674,453 B1 | 1/2004 | Schilit et al. | |
| 6,751,732 B1 * | 6/2004 | Strobel et al. | 713/176 |
| 6,801,932 B1 * | 10/2004 | Picoult et al. | 709/206 |
| 6,819,917 B1 * | 11/2004 | Yamauchi | 455/411 |
| 2001/0037462 A1 | 11/2001 | Bengtson | |
| 2002/0191210 A1 * | 12/2002 | Staas et al. | 358/1.15 |
| 2003/0005330 A1 | 1/2003 | Berkema et al. | |
| 2003/0011810 A1 * | 1/2003 | Strobel et al. | 358/1.15 |

FOREIGN PATENT DOCUMENTS

| | | |
|---|---|---|
| EP | 1045574 | 10/2000 |
| EP | 001045574 A1 * | 10/2000 |
| EP | 1146684 | 10/2001 |
| EP | 1091536 A3 | 12/2003 |
| WO | 00/79732 | 12/2000 |

OTHER PUBLICATIONS

Specification of U.S. Appl. No. 09/727,893, titled "Method and System for Remote Retrieval of Messages Using Spontaneous Networking Technology," filed Nov. 30, 2000.

Specification of U.S. Appl. No. 09/728,237, titled "Method and System for Remote Printing of Documents," field Nov. 30, 2000.

Specification of U.S. Patent Application titled "Method and System for Secure Delivery and Printing of Documents," filed contemporaneously herewith.

Specification of U.S. Patent Application titled "Method and System for Secure Delivery and Printing of Documents Via A Networked Device," filed contemporaneously herewith.

Omatseye, Sam, "vVault Enhances Productivity for Mobile Professionals," RCR Wireless News (www.rcrnews.com), Mar. 5, 2001.

vVault, Powering Mobile Productivity; www.vvault.com, downloaded Jul. 9, 2001.

* cited by examiner

METHOD AND SYSTEM FOR SECURE DELIVERY AND RETRIEVAL OF DOCUMENTS UTILIZING A FACSIMILE MACHINE

FIELD OF THE INVENTION

The invention disclosed herein relates generally to messaging technology, and more particularly to a system and method for providing secure, on-demand delivery and retrieval of documents utilizing an adaptor connected to a facsimile machine.

RELATED APPLICATIONS

This application is related to U.S. application Ser. No. 09/707,561, filed Nov. 7, 2000, now U.S. Pat. No. 6,801,932; Ser. No. 09/727,893, filed Nov. 30, 2000, now U.S. Pat. No. 6,654,601; Ser. No. 09/728,237, filed Nov. 30, 2000, now U.S. Pat. No. 6,744,528; Ser. No. 09/904,344, filed Jul. 12, 2001; and Ser. No. 09/904,401, filed Jul. 12, 2001, now U.S. Pat. No. 6,751,732, each assigned to the assignee of the present invention.

BACKGROUND OF THE INVENTION

In today's rapidly paced society, professional and personal demands on messaging technologies, such as voice mail, e-mail, facsimile and pagers, have greatly increased. The development of this technology, in turn, has increased demands on mobile people who rely on these messaging devices for a variety of business and social communications. Specifically, these expectations have forced the mobile professional to demand the ability to receive messages regardless of time, location, or availability of messaging devices. According to a recent study by Pitney Bowes Inc. of Stamford, Conn., a typical business professional receives 169 messages a day. Many of these messages are delivered using some form of electronic and mobile communication such as cellular telephones, facsimiles, analog/digital telephone, pagers, e-mail transmission, and personal data assistants. These messages help determine the mobile professional's daily plans, keep him/her in contact with his/her community and enable him/her to accomplish his/her professional and personal goals.

Users, recognizing the capabilities of these devices, have relied on these devices such that they have become nearly indispensable tools for many businesses and individual consumers. Specifically recognized as invaluable are the inherent capabilities of a facsimile as an effective means of quickly and efficiently transmitting many types of documents from one known and specified location to another known and specified location. Facsimile machines are indispensable global tools, because they are used throughout the world and are accessible by and compatible with any other facsimile in the world. In addition, the use of facsimile machines has significantly improved the speed of transmittal of documents as compared to the sending of such a document through the postal services and/or various other express courier services, which, in general, require overnight delivery. Furthermore, facsimile machines have eased the travel burden on mobile professionals by eliminating the total number of printed documents they must carry to offsite meetings. With the aid of facsimile machines, any forgotten necessary documents may be retrieved by a simple facsimile (provided there is someone that has access to and can send the necessary documents).

Facsimile machines also provide printing capabilities for users. For example, it is not always convenient or desirable to review documents received electronically on devices with small display screens, such as, for example, a pager or personal data assistant (PDA). In those instances, the user may wish to print a hard copy of the document for ease in review and editing. The user can have these documents sent to a facsimile machine for printing, thereby enabling the user to easily read and edit the document.

There are problems, however, with conventional document messaging systems, such as, for example, facsimile machines. For example, often the reception of a secure document or message via a facsimile machine is a coordinated affair. Specifically, the mobile user must find a free facsimile machine and then communicate the telephone number of the facsimile machine to a person waiting to send the fax. If the message is a confidential communication, the sender also must know that the recipient will be present at the precise time the sender transmits the facsimile. Otherwise, if the receiving facsimile machine is in a public location, there is a risk that the message will be printed and left in an accessible location before the intended recipient gets there. Thus, if the intended recipient is not physically present at the facsimile machine, the intended recipient may never receive the message, and/or any confidentiality may be broken. Additionally, if there is not other person waiting to send the fax, a mobile user will not be able to retrieve any documents via facsimile.

Furthermore, transmissions via a standard telephone line to which facsimile machines are typically connected are not secure. Thus, any documents sent via a standard telephone line to a facsimile machine are capable of being intercepted, thereby compromising the security of such documents.

Thus, there exists a need for a messaging system that can provide secure, on-demand delivery of documents, ensuring receipt by the intended recipient and ensuring confidentiality of the contents of the document or message, and retrieving the document to a printed medium utilizing a facsimile machine.

SUMMARY OF THE INVENTION

The present invention alleviates the problems associated with the prior art and provides secure, on-demand delivery and retrieval of documents, messages and the like utilizing an adaptor coupled to a facsimile machine.

In accordance with the present invention, an adaptor is coupled between a facsimile machine and a telephone line. A mobile device communicates with the adaptor to allow a user to log onto a document delivery system, via the telephone line, and select a document, message or the like to be printed. The adaptor or mobile device provides the telephone number of the facsimile machine to the data center, which then sends the selected documents to the facsimile machine through the adaptor. Alternatively, the data center can encrypt the documents before sending. A corresponding decryption key is preloaded in the mobile device or adaptor, and used by the adaptor to decrypt the documents prior to sending to the facsimile machine. Accordingly, a user can securely retrieve and print documents via a facsimile machine without any assistance.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE PRESENT INVENTION

Figure 1:
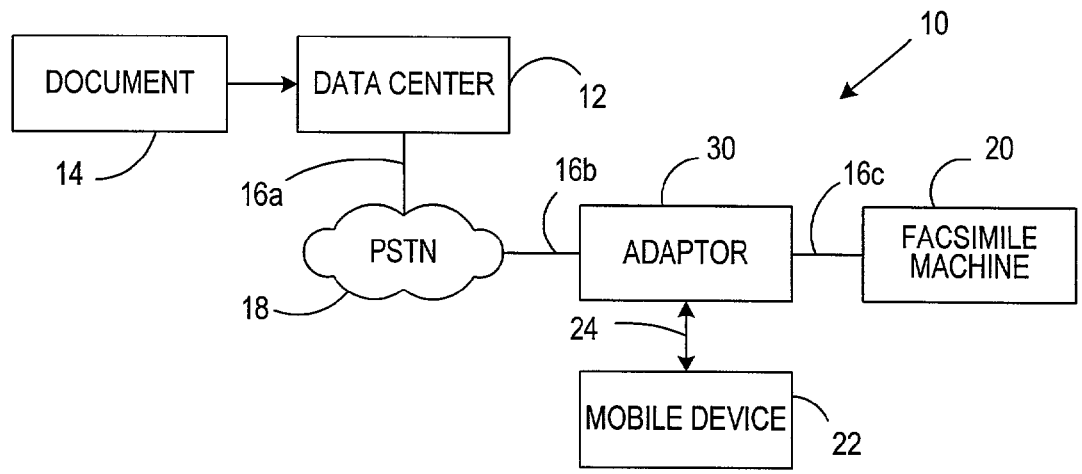
FIG. 1 illustrates in block diagram form a document retrieval system according to the present invention.

In describing the present invention, reference is made to the drawings, wherein there is seen in FIG. 1 a system 10 for secure delivery and printing of documents utilizing a facsimile machine according to the present invention. The term document, as used herein, refers to any type of document, message (e-mail, voicemail, textual, or any other message format), attachment to a message, or the like that is already in or may be converted to electronic form and electronically transmitted. The system 10 includes a data center 12 that provides a document repository for a plurality of users. Thus, for example, a document 14 intended for a specified recipient is sent to data center 12 and stored in data center 12. Each registered user of data center 12 is provided with a designated location for storage of documents intended for that user, such as, for example, a dedicated "In Box" similar to that found on conventional e-mail systems. While FIG. 1 illustrates document 14 being sent directly to data center 12, it should be understood the document 14 may first be sent to a specified recipient's default destination, such as, for example, an e-mail address, facsimile machine, or voice system, which then routes the document to data center 12.

Data center 12 is connected to a Public Switched Telephone Network (PSTN) 18 via telephone line 16a. System 10 also includes a facsimile machine 20. Facsimile machine 20 can by any type of facsimile machine as is known in the art. In accordance with the present invention, an adaptor 30 is coupled between facsimile machine 20 and PSTN 18 via telephone lines 16c and 16b. Adaptor 30 is preferably a portable device that a user can carry with him and attach to any facsimile machine 20 utilizing standard RJ 11 connectors. Alternatively, an adaptor 30 may be provided externally or internally to facsimile machine 20 for general use by any user.

System 10 also includes a mobile device 22 associated with each registered user of the system 10. Mobile device 22 can be, for example, a personal data assistant (PDA), pager, cell phone, laptop computer, or any other mobile computing device typically carried by a user. Mobile device 22 is used to log into the data center 12 via adaptor 30 and PSTN 18 to retrieve any document(s) 14 that are presently stored in that user's in-box as will be described below. The user establishes a communication link 24 between the mobile device 22 and adaptor 30 to log into data center 12 and select one or more documents 14 for printing utilizing facsimile machine 20. Communication link 24 can be either a wired link or a wireless link, such as, for example, an infrared or radio frequency link. A wireless link can utilize ad-hoc, spontaneous networking technology such as, for example, Bluetooth or IEEE 802.11. Alternatively, communication link 24 can be via inductive coupling between mobile device 22 and adaptor 30.

Figure 2A:
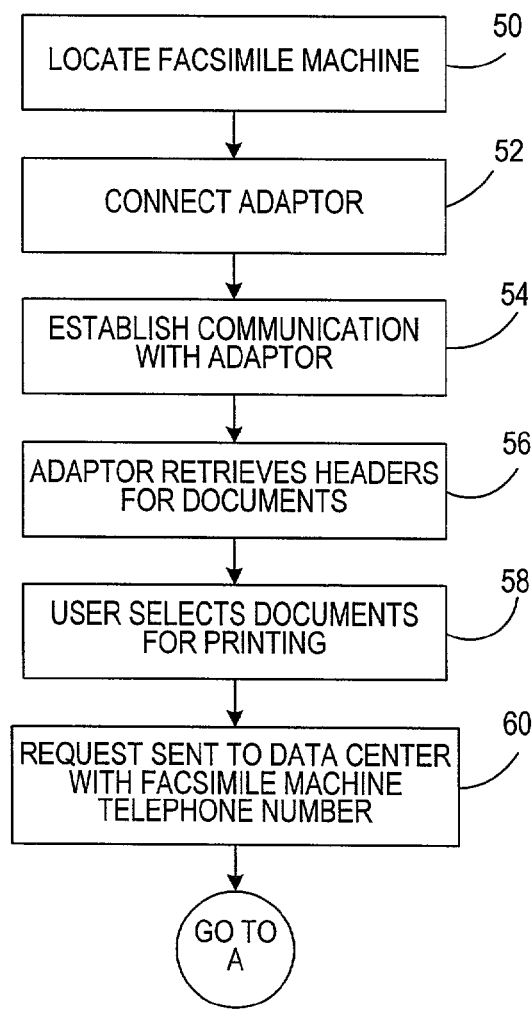
FIGS. 2A and 2B illustrate in flow diagram form a process flow of document retrieval according to the present invention.

The operation of the system 10 will be described with respect to the flow diagram of FIGS. 2A and 2B. Suppose, for example, a user wishes to retrieve one or more documents 14 stored in data center 12. In step 50, the user locates an available facsimile machine 20. In step 52, if an adaptor 30 according to the present invention is not already coupled to facsimile machine 20, the user connects an adaptor 30 between the PSTN 18 and facsimile machine 20. It should be noted that adaptor 30 may be daisy chained with other adaptors without affecting operation of the system 10. Accordingly, if facsimile machine 20 is already provided with an external or internal adaptor, a user can still daisy chain his own adaptor 30 into system 10 if desired.

In step 54, the user establishes a communication with the adaptor 30 via a mobile device 22 and passes information, such as, for example, the user's identity and password, to adaptor 30. As noted above, the communication link 24 between adaptor 30 and mobile device 22 can be either a hard-wired link, such as, for example, via a docking station, or a wireless link, such as, for example, an infrared or radio frequency link. In step 56, adaptor 30, utilizing the information sent from mobile device 22, communicates with data center 12 via PSTN 18 and retrieves a list of documents, identified by the headers for each document, stored in data center 12 for that user. The list is sent to mobile device 22 via adaptor 30. Alternatively, the list of documents may already be stored in mobile device 22 from a previous communication. In step 58, the user selects, via the mobile device 22, one or more documents 14 he desires to have printed from the list of document headers. In step 60, the request is sent from the mobile device 22 to the data center 12 via adaptor 30 and PSTN 18. Additionally, the adaptor 30 will provide the telephone number of facsimile machine 20 to data center 12. Alternatively, the telephone number of facsimile machine 20 could be communicated to or input to mobile device 22 and sent from mobile device 22 to data center 12.

Figure 2B:
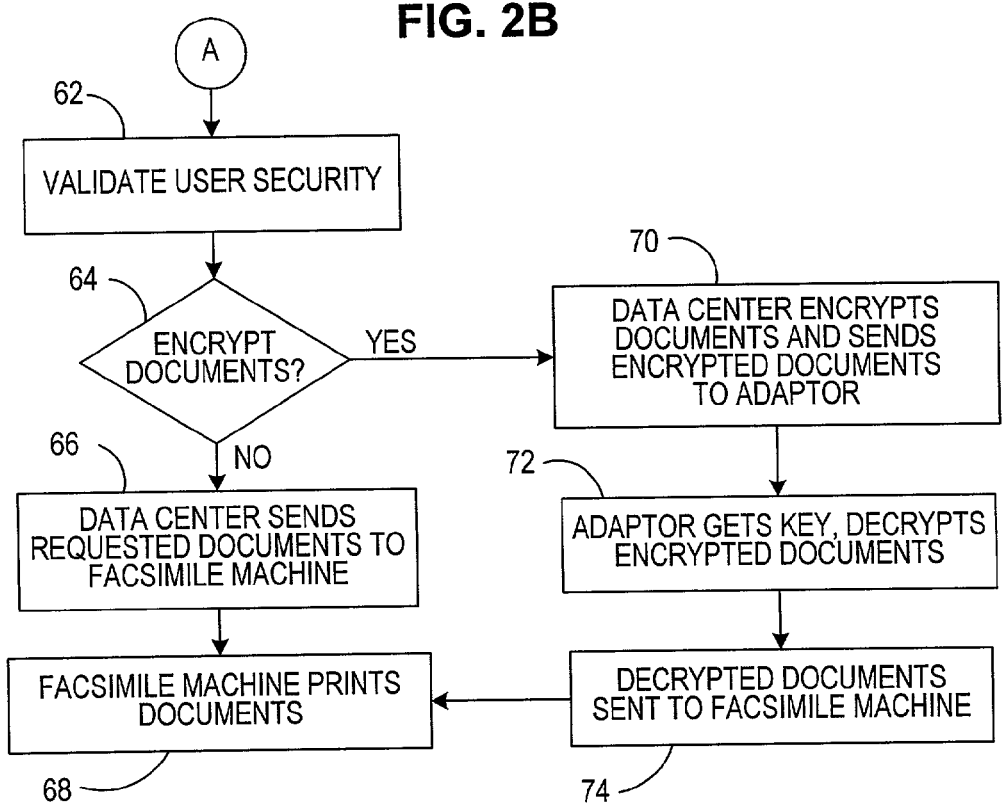

Referring now to FIG. 2B, once the data center 12 receives the request for the document(s) 14, the data center will validate the user's security in step 62, such as, for example, by requesting a user identification and password. Once the user's security has been validated, it is determined in step 64 if the document(s) 14 are to be encrypted before sending. If the document(s) 14 are not to be encrypted, then in step 66 the data center 12 sends the requested document(s)

14 to the facsimile machine via PSTN 18 through adaptor 30. In step 68, facsimile machine 20 prints the document(s) 14. It should be noted that encryption of the document(s) 14 is optional and a decision need not be made. In such circumstances, the process flow according to the present invention will go directly from step 60 to step 66.

If a determination as to encryption is being made and in step 64 it is determined that the document(s) 14 will be encrypted, then in step 70 the data center 12 encrypts the document(s) 14 and sends the encrypted document(s) to adaptor 30. In step 72, the adaptor 30 retrieves the key necessary to decrypt the encrypted document(s) 14. The key may either be preloaded into the adaptor 30, or preloaded into the mobile device 22 and sent to adaptor 30. In step 74, the adaptor 30 decrypts the document(s) 14 and sends the decrypted document(s) 14 to facsimile machine 20. In step 68, facsimile machine 20 prints the document(s) 14.

Thus, according to the present invention, secure, on-demand printing of documents to a facsimile machine is provided, thereby allowing a user to securely retrieve documents without the need for additional assistance.

Figure 3:
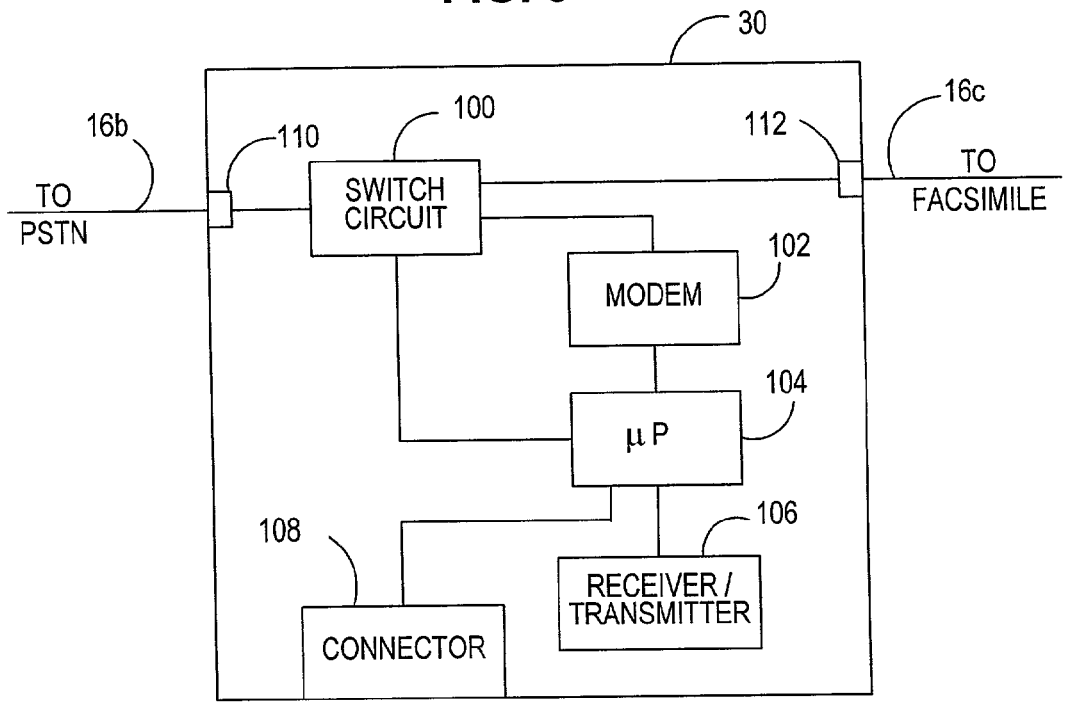
FIG. 3 illustrates in block diagram form an adaptor according to an embodiment of the present invention.

FIG. 3 illustrates in block diagram form one embodiment for adaptor 30, and specifically for use where document(s) 14 will not be encrypted. Adaptor 30 includes a microprocessor 104 for controlling the operation of adaptor 30. A switch circuit 100 is controlled by microprocessor 104. Switch circuit 100 has a first input/output coupled to input/output port 110, a second input/output coupled to input/output port 112 and a third input/output coupled to a modem 102. Thus, switch circuit 100 is used to connect PSTN 18, via telephone line 16b, to either facsimile machine 20, via telephone line 16c, or to microprocessor 104 via modem 102. The modem 102 demodulates telecommunications signals received into data signals for transmission to microprocessor 104 and modulates data signals from microprocessor 104 into telecommunications signals for transmission over a telephone line. A receiver/transmitter 106 is coupled to microprocessor 104 for communicating with mobile device 22. Receiver/transmitter 106 may be, for example, an infrared receiver/transmitter or a radio frequency receiver/transmitter. Adaptor 30 may also be provided with a connecter 108 for a hard-wired connection with mobile device 22, such as, for example, via a docking station. It should be understood that only one or both of receiver/transmitter 106 and connecter 108 may be provided.

The operation of adaptor 30 is as follows. During normal operation of facsimile machine 20, switch circuit 100 connects facsimile machine 20 to PSTN 18 via telephone lines 16b and 16c. When a user establishes a communication with adaptor 30 via a mobile device 22 (step 54 of FIG. 2A), either through receiver/transmitter 106 or connector 108, microprocessor 104 signals switch circuit 100 to connect PSTN 18 to microprocessor 104 via the modem 102. The user can then communicate with data center 12 to select one or more document(s) 14 for retrieval (steps 56–60 of FIG. 2A). Once the microprocessor 104 has sent the request to the data center 12 along with the telephone number of the facsimile machine 20, microprocessor 104 will signal switch circuit 100 to connect facsimile machine 20 to PSTN 18 and data center 12 will send the requested document(s) 14 to facsimile machine 20 (step 66 of FIG. 2B).

Figure 4:
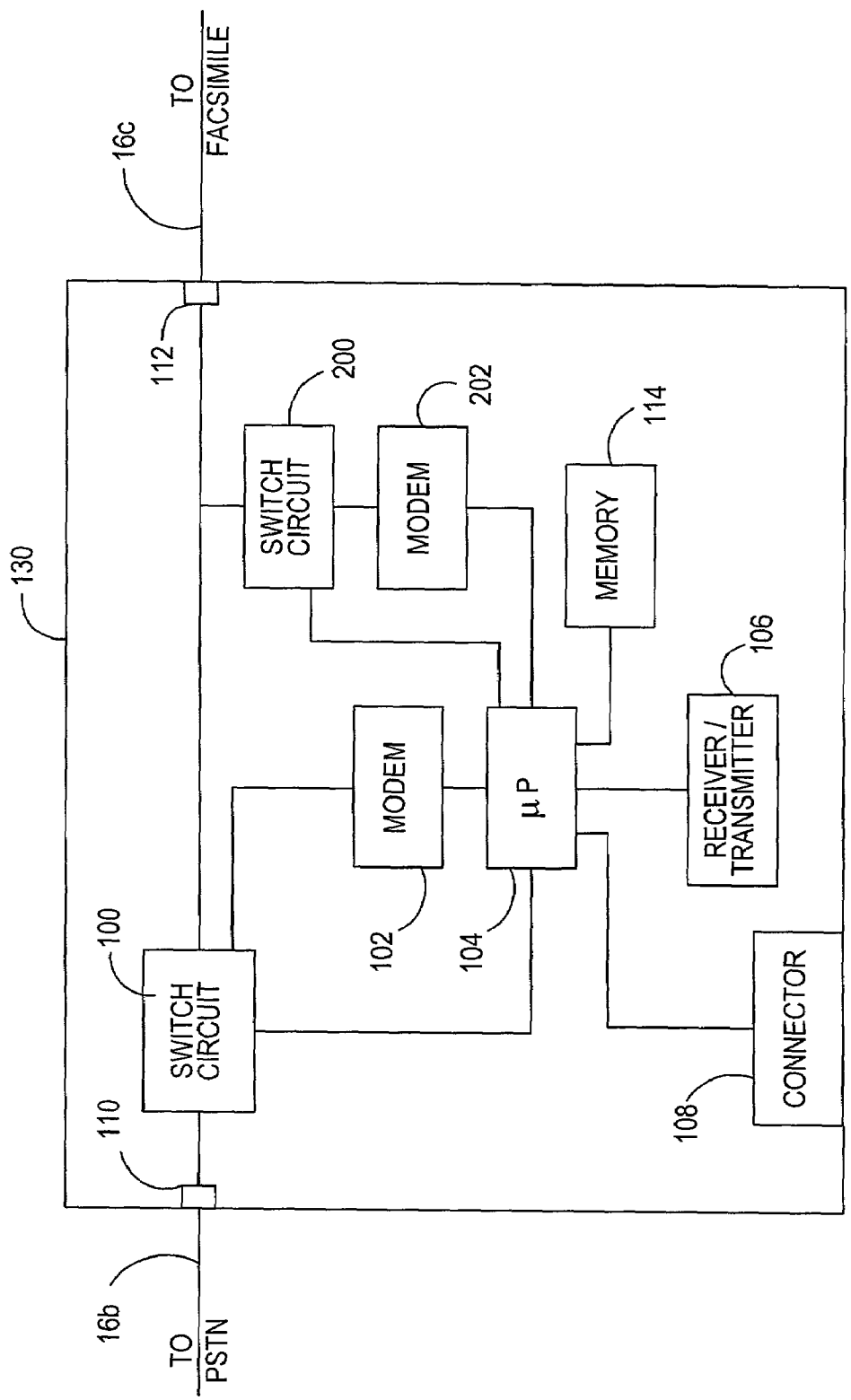
FIG. 4 illustrates in block diagram form an adaptor according to another embodiment of the present invention.

FIG. 4 illustrates in block diagram form an adaptor 130 for use where document(s) 14 may be encrypted. Adaptor 130 is similar to adaptor 30 as described with respect to FIG. 3, and includes a second switch circuit 200 for connecting facsimile machine 20 to PSTN 18 via modem 202, microprocessor 104, modem 102 and switch circuit 100. Switch circuit 200 is a normally open switch, i.e., there is no connection between modem 202 and telephone line 16c. It should be noted that while two separate modems 102, 202 are shown, only a single modem need be provided.

If the document(s) 14 are not encrypted, the operation of adaptor 130 is similar to that of adaptor 30 as described with respect to FIG. 3, with switch circuit 200 in its normally open position. If the document(s) 14 are to be encrypted, the operation of adaptor 130 is as follows. When a user establishes a communication with adaptor 130 via a mobile device 22 (step 54 of FIG. 2A), either through receiver/transmitter 106 or connector 108, microprocessor 104 signals switch circuit 100 to connect PSTN 18 to microprocessor 104 via the modem 102. The user can then communicate with data center 12 to select one or more document(s) 14 for retrieval (steps 56–60 of FIG. 2A). Data center 12 will encrypt the selected document(s) 14 prior to sending to facsimile machine 20 (step 70 of FIG. 2B). Once the microprocessor 104 has sent the request to the data center along with the telephone number of the facsimile machine 20, microprocessor 104 will signal switch circuit 200 to close while maintaining switch circuit 100 in its current position, i.e., connecting telephone line 16b to microprocessor 104 via modem 102, thereby connecting facsimile machine 20 to PSTN 18 via modem 202, microprocessor 104, modem 102 and switch circuit 100. Data center 12 will send the requested document(s) 14 in encrypted form to adaptor 130 where they will be routed to the microprocessor 104 through modem 102 by switch circuit 100. Microprocessor 104 will retrieve the corresponding key for decrypting the document(s) 14 and decrypt the document(s) 14 (step 72 of FIG. 2B). The corresponding key can either be retrieved from memory 114 in adaptor 130, or alternatively can be provided to adaptor 130 by mobile device 22. Microprocessor 104 will then send the decrypted documents to facsimile machine 20 via modem 202 and switch circuit 200 (step 74 of FIG. 2B) for printing.

Thus, according to the present invention, secure, on-demand retrieval and printing of documents to a facsimile machine is provided utilizing a mobile device and an adaptor, thereby allowing a user to securely retrieve documents without the need for additional assistance.

In addition, adaptors 30 and 130 can also be used to upload documents received from mobile device 22 via communication link 24 to data center 12 via PSTN 18. Adaptors 30 and 130 can also be used to send documents received from mobile device 22 via communication link 24 directly to facsimile machine 20 for printing.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A system for remotely retrieving a document comprising:
   a data center to store said document, said data center being coupled to a telephone network
   a facsimile machine coupled to said telephone network; and
   a portable adaptor coupled between said telephone network and said facsimile machine, said portable adaptor including a communication device to communicate with a mobile device,
   wherein said mobile device communicates with said adaptor and causes said adaptor to retrieve said document via said telephone network, and said adaptor provides said document to said facsimile machine for printing.

2. The system according to claim 1, wherein said document is selected from a plurality of documents stored in said data center.

3. The system according to claim 1, wherein said adaptor is further configured to receive a document from said mobile device via said communication between said mobile device and said adaptor and send said received document to said data center.

4. The system according to claim 1, wherein said mobile device communicates with said adaptor via a hard-wired communication.

5. The system according to claim 1, wherein said mobile device communicates with said adaptor via a wireless communication.

6. The system according to claim 5, wherein said wireless communication is an infrared communication.

7. The system according to claim 5, wherein said wireless communication is a radio frequency communication.

8. The system according to claim 5, wherein said wireless communication is automatically established.

9. The system according to claim 5, wherein said wireless communication includes inductive coupling.

10. The system according to claim 1, wherein said document is encrypted before being retrieved by said adaptor, and said adaptor decrypts said encrypted document before providing said document to said facsimile machine.

11. The system according to claim 10, wherein said adaptor decrypts said encrypted document with a key provided by said mobile device.

12. The system according to claim 1, wherein said mobile device is a personal data assistant.

13. The system according to claim 1, wherein said mobile device is a pager.

14. The system according to claim 1, wherein said mobile device is a laptop computer.

15. The system according to claim 1, wherein said mobile device is a cell phone.

16. The system according to claim 1, wherein said adaptor is further configured to receive a document from said mobile device via said communication between said mobile device and said adaptor and send said received document to said facsimile machine for printing.

17. A method for remotely retrieving and printing a selected document stored in a data center, said data center being coupled to a telephone network, said method comprising the steps of:
   coupling a portable adaptor to said telephone network between said data center and a facsimile machine, said portable adaptor including a communication device to communicate with a mobile device;
   establishing a communication between a mobile device and said data center via said adaptor and said telephone network;
   selecting a document stored in said data center using said mobile device;
   sending said selected document to said facsimile machine through said adaptor; and
   printing said selected document at said facsimile machine.

18. The method according to claim 17, wherein said step of selecting a document further comprises:
   selecting a document from a plurality of documents stored in said data center.

19. The method according to claim 17, wherein before said step of sending said selected document, said method further comprises:
   encrypting said selected document.

20. The method according to claim 19, wherein said step of sending said selected document further comprises:
   sending said encrypted selected document to said adaptor;
   decrypting said encrypted selected document at said adaptor; and
   sending said decrypted selected document to said facsimile machine.

21. The method according to claim 20, wherein said step of decrypting further comprises:
   obtaining a key from said mobile device; and
   using said key to decrypt said encrypted selected document.

22. The method according to claim 17, wherein said step of establishing a communication further comprises:
   establishing a hard-wired communication between said adaptor and said mobile device.

23. The method according to claim 17, wherein said step of establishing a communication further comprises:
   establishing a wireless communication between said adaptor and said mobile device.

24. The method according to claim 23, wherein said wireless communication is an infrared communication.

25. The method according to claim 23, wherein said wireless communication is a radio frequency communication.

26. The method according to claim 23, wherein said wireless communication is established automatically.

27. The method according to claim 23, wherein said wireless communication includes inductive coupling.

28. The method according to claim 17, wherein said step of selecting a document further comprises:
   retrieving a header for each of a plurality of documents stored in said data center; and
   selecting said document from said plurality of documents.

29. The method according to claim 17, wherein said adaptor is a portable device.

30. The method according to claim 17, wherein said mobile device is a personal data assistant.

31. The method according to claim 17, wherein said mobile device is a pager.

32. The method according to claim 17, wherein said mobile device is a laptop computer.

33. The method according to claim 17, wherein said mobile device is a cell phone.

* * * * *